US011763394B2

(12) United States Patent
Vilmont

(10) Patent No.: US 11,763,394 B2
(45) Date of Patent: Sep. 19, 2023

(54) METHOD AND SYSTEM FOR BUYING AND SELLING PROPERTY TAX LIENS AND DETERMINING PROPERTY TAX LIEN PRICE AND FAIR VALUE ON A SECONDARY MARKET

(71) Applicant: Unique Exchange Inc., Sheridan, WY (US)

(72) Inventor: Victor Vilmont, San Francisco, CA (US)

( * ) Notice: Subject to any disclaimer, the term of this patent is extended or adjusted under 35 U.S.C. 154(b) by 1701 days.

(21) Appl. No.: 14/588,574

(22) Filed: Jan. 2, 2015

(65) Prior Publication Data
US 2015/0199766 A1    Jul. 16, 2015

Related U.S. Application Data

(60) Provisional application No. 61/925,863, filed on Jan. 10, 2014.

(51) Int. Cl.
*G06Q 50/16*    (2012.01)
*G06Q 40/10*    (2023.01)

(52) U.S. Cl.
CPC ............ *G06Q 40/10* (2013.01); *G06Q 50/16* (2013.01)

(58) Field of Classification Search
None
See application file for complete search history.

(56) References Cited

U.S. PATENT DOCUMENTS

| | | | | |
|---|---|---|---|---|
| 5,970,479 | A * | 10/1999 | Shepherd | G06Q 40/02 705/37 |
| 8,606,679 | B1 * | 12/2013 | Daniel | G06Q 50/16 705/36 R |
| 8,620,791 | B1 | 12/2013 | Herron | |
| 2004/0058731 | A1 * | 3/2004 | Rossides | G06Q 50/34 463/42 |
| 2006/0190277 | A1 * | 8/2006 | Zimmerman | G06Q 30/0645 705/26.1 |
| 2008/0046353 | A1 * | 2/2008 | Poltorak | G06Q 40/04 705/37 |

(Continued)

OTHER PUBLICATIONS

Nicholas J. Fiore, Fractional Interest Discount Was Allowed for Properties Held by Decedent's Estate and QTIP Trust, Sep. 1996, The Tax Advisor, American Institute of Certified Public Accountants vol. 27, Issue 9, 2 pages (581/582) (Year: 1996).*

*Primary Examiner* — Benjamin S Brindley
(74) *Attorney, Agent, or Firm* — Miller Law Group, PLLC

(57) ABSTRACT

Method and system for buying and selling property tax liens and determining a property tax lien fair secondary market price are disclosed. The system comprises a terminal used to input parameters related to tax lien, a central processing computer calculating tax lien value and applying method based on system parameters and parameters inputted by remote system users, and an interface used to present the determined tax lien value to the users, register a trade of tax lien or a fraction of tax lien, manage or liquidate a property backing the tax lien. In different countries, tax liens or instruments using similar principals are known by different names, including tax deeds, redeemable tax deeds, delinquent property tax certificates, property tax sale certificates, and others. All such instruments are commonly referred to herein as tax liens.

2 Claims, 7 Drawing Sheets

(56) References Cited

U.S. PATENT DOCUMENTS

| | | | | |
|---|---|---|---|---|
| 2010/0088212 A1* | 4/2010 | Czupek | ............... | G06Q 40/04 |
| | | | | 705/37 |
| 2010/0131426 A1* | 5/2010 | Kroutik | ............... | G06Q 40/00 |
| | | | | 705/37 |
| 2011/0022542 A1* | 1/2011 | Lutnick | ............... | G06Q 40/04 |
| | | | | 705/37 |
| 2011/0258102 A1* | 10/2011 | Blasi | ............... | G06Q 40/04 |
| | | | | 705/37 |
| 2013/0262343 A1* | 10/2013 | Kirtchakov | ............ | G06Q 40/06 |
| | | | | 705/36 T |

* cited by examiner

METHOD AND SYSTEM FOR BUYING AND SELLING PROPERTY TAX LIENS AND DETERMINING PROPERTY TAX LIEN PRICE AND FAIR VALUE ON A SECONDARY MARKET

CROSS-REFERENCE TO RELATED APPLICATIONS

This application claims benefit under 35 U.S.C. 119(e) of Provisional Application Ser. No. 61/925,863, filed Jan. 10, 2014, the content of which is incorporated herein by reference.

FIELD OF THE INVENTION

The present invention relates to buying, selling and managing property tax liens, and more particularly to how a tax lien secondary market price, or value for a fraction of tax lien can be determined and then communicated to the remote users allowing them to buy or sell tax liens, or fractions of individual tax liens, via an electronic system in real time. In different countries, tax liens or instruments using similar principals are known by different names, including tax deeds, redeemable tax deeds, delinquent property tax certificates, property tax sale certificates, and others. For simplicity, all such instruments are commonly referred to herein as tax liens.

BACKGROUND OF THE INVENTION

Some governments across the world use tax liens to enforce payment of back taxes owed on the property. Tax liens are placed by the taxing authority or their agents against the property of an individual or an entity that failed to pay the tax, and if tax is not settled within an allowed timeframe, the tax liens are then sold to a third party buyer. Most often tax liens are presented in a form of certificate with a principal price that is equivalent to the amount of tax owed. The buyer of the tax lien certificate essentially pays to the government the back owed tax and becomes entitled to receive interest on the tax lien certificate principal price, as well as the right to foreclose on the property if the tax lien certificate is not redeemed from the buyer during specified redemption period.

Therefore, tax lien certificates can be considered a sort of securities that are issued by the government, pay interest to the certificate holder, and are backed by a property. However, there is no well-established secondary market to buy or sell tax liens after they were initially bought from the government, or standardized solutions (such as brokerage or stock exchange systems) to enable such activities. In addition, the problem faced by the potential participants on such a market is that there is no specific valuation method to determine a fair current price of the tax lien. This is because unlike with bonds or options, the value of the tax lien's underlying asset (a property, most often real-estate, with delinquent tax) has no direct relation to tax lien principal price (actual amount of tax owed). It makes it very difficult for buyers or sellers to estimate tax lien current value by using any conventional pricing approach or even by trying to compare one tax lien with another.

A specific difficulty for potential buyers and sellers is that each tax lien is placed against different property, and the information about such property is often limited. Unlike with publicly traded companies, obtaining information about the delinquent tax property requires specific research for title ownership, detailed property description, and other data kept with number of government departments, what makes full assessment of underlying asset impractical.

An additional problem faced by potential buyers and sellers is that tax lien certificates are not fungible, and frequently have considerable principal price (face value) which is much higher comparing to stocks or mutual funds units. This inflexibility restricts the dynamics for potential secondary market for tax liens, as well as it makes trading activity possible for large capital transactions only, that are not available to average investors.

A further problem faced by potential buyers and sellers is that tax liens can be issued by different types of government authorities, starting from municipal and ending by federal levels, where terms of sale, redemption periods, and property types can vary significantly. Moreover, tax lien certificates are offered in limited quantities and usually with limited or restricted public accessibility to the initial offering, making them mostly unavailable for potential buyers who are located remotely.

Therefore, there is a need to provide a method and system that can allow easy and accessible buying and selling of tax liens and quick determination and presentation of a tax lien secondary market value, thereby enabling potential market participants to buy or sell tax liens efficiently and make such process simple enough to be understandable for all types of investors.

Prior Art

U.S. Pat. No. 8,620,791 by Charles Herron and U.S. Patent Application Publication 2013/0262343 by LienMarket LLC, which collectively form the most pertinent prior art we are currently aware of in the field concerned.

In U.S. Pat. No. 8,620,791, Herron is concerned with a tax lien primary market tool, in which a public agency obtains a loan using the outstanding tax liens of the taxing authority as collateral. The tax authority's collection procedures remain in place in normal fashion, but the public agency assigns the lender its right to receive the collected monies in order pay off the outstanding loan. The reference is thus concerned with the 'primary' sale of the tax lien from the issuing tax authority.

To the contrary, the present invention is concerned with an online secondary market for tax lien certificates, whereby tax lien certificate holders who have already obtained such tax lien certificates from the taxing authority can resell their certificates to others users of the online marketplace.

U.S. Patent Application Publication 2013/0262343 is more pertinent than the first reference, as LienMarket LLC is concerned with an online secondary market for tax liens. The reference employs an online auction/negotiation process initiated by the potential buyer of a listed tax lien, where the potential buyer places a first bid, based on which a subsequent counter-bidding process can be initiated in order to negotiate an agreed-upon price between the buyer and seller for the tax lien in question.

A notable distinction of present invention over the prior art is that the tax lien certificate holder is able to divide the tax lien into multiple 'units' or fractions, and then list such units as available for sale at a unit price specified by the current certificate holder. This does not appear to be disclosed or suggested in either of the forgoing references. The Herron reference uses the taxing authority's total collection of outstanding tax liens over a span of years as collateral for the public agency's loan, while the LienMarket reference is concerned with tax lien certificates being sold individually, but 'as a whole', in a secondary market.

As a result of this 'divided unit' aspect of the present invention, whereby multiple parties may end up owning respective partial shares of a tax lien certificate on a given property, the present invention also includes other unique tools, including a process whereby the multiple parties in such instance can individually vote on whether to sell the property or maintain co-ownership of same in the event that the tax lien certificate is not redeemed before expiry of the redemption.

As additional notable difference from the prior art, in the event that the parties opt for co-ownership of the property, the system includes a selectable option for engaging an operating entity of the secondary market system, or a third party entity, as a rental agency for the purpose of renting out the property concerned.

Another distinctive aspect of present invention is the automatic entry of the property into a liquidation sale module, where the property concerned is listed for sale at a rate discounted from the assessed property value, on the condition that the buyer must wait for the redemption period to expire.

SUMMARY OF THE INVENTION

Accordingly, the present invention provides a method and system for buying and selling property tax liens and determining a fair property tax lien price on a secondary market. A preferred embodiment of the present invention includes: a terminal used to input parameters related to tax lien; a central processing computer calculating tax lien price, or a value of a fraction of the tax lien, by applying a calculation method based on system parameters and parameters inputted by the users; an interface used to present the determined tax lien value to the users, register a trade of the tax lien and manage or liquidate property backing tax lien; and a data storage and backup facility for storing registered tax lien trade records and the parameters previously inputted by the users.

Accordingly to the preferred embodiment of the present invention, an initial step for enabling determination of the fair tax lien secondary market price and listing of the tax lien for trading in the system requires that data about the tax lien is submitted in the centralized processing computer. Such tax lien data can be inputted directly via an administrative terminal linked to the central processing computer via a communications network, by an operating entity administrator-user or an operating entity's automated logic capturing data from tax lien issuers, or by the remote users accessing a user interface on remote devices that are linked to the central processing computer via the communications network. Once the data about tax lien is inputted, the centralized processing computer will calculate the current fair secondary market value of the tax lien and will present such value via user interface.

Preferably, prior to inputting tax lien information in the system, and unless the operating entity has been already officially registered as owner of the tax lien, an additional step will involve the operating entity obtaining an official ownership right for the tax lien, or entering into a brokerage relationship with a user who bought tax lien directly from the issuer. Subsequently, after tax lien is entered in the system, the operating entity will assign such tax lien ownership back to the user within internal records of the system that are distinct from the registered ownership information maintained by the issuer.

Preferably, to enter information about tax lien in the system, the operating entity will input at least following parameters: a tax lien initial price (also known as upset price or base value); a property value of the property backing the tax lien; cost of any subsequent taxes and fees (if any); tax lien interest rate (if any) paid on initial price; tax lien final bid cost (if different than the tax lien initial price); property sale tax rate; tax lien redemption period; tax lien currency. Preferably the operating entity also configures at least following controls for tax lien record in the system: setting for fractional division of the tax lien (i.e. a number of units into which the tax lien is to be divided); an adjustment amount for use in determining the automatically calculated fair secondary market price; a cap restriction on the fair secondary market price; a discount to be applied to the property value to determine a liquidation price to be used for a liquidation listing of the property; and a portion of the tax lien interest to be passed on the users.

The tax lien final bid used in some jurisdictions to refer to a vale the registered tax lien holder has agreed in advance to pay to the issuer for the property in a tax sale in the event that the tax lien is not redeemed by the delinquent taxpayer. The subsequent taxes and fees cost may be estimated based on an approximated future property value and approximated future tax rate for the time when each subsequent property tax payment becomes due. The actual current property value and actual current property tax rate may be used as the approximated future property value and tax rate without modification, or may be used to calculate a prediction of the future property value and tax rate.

Preferably, the operating entity will also submit digital copies of tax lien related documentation (if any available), which will be saved at the data storage and backup facility.

Preferably, prior to completing entry for listing tax lien for trading, it is required that the user who has been recorded as an owner of the tax lien will access the data previously recorded about tax lien via using user interface and configure such tax lien in the system as a single unit or a set of multiple units, where each unit will represent a fraction of the tax lien, and, accordingly the sum of all units will be equal to 100% of the tax lien. Subsequently, users will use the user interface to specify all or only several units of the tax lien to be listed for trading.

In one embodiment, in order to sell tax lien units, the selling user that is currently recorded as the owner of the tax lien units within the internal records of the system, will access via the user interface tax lien data previously recorded and configured in the system, and will input the number units to be listed for sale and an asking price per unit that can be lower or higher relative to the relevant fraction of the fair tax lien secondary market price calculated by the centralized processing computer. That is, the selling user can use the fair secondary market price displayed to him/her within the user interface to decide a suitable asking price for the unit(s) he/she is listing for sale.

Preferably, the selling user can have an option to list units or sets of units belonging to same tax lien at different prices.

Preferably, the selling user can have an option to cancel or partially cancel the offer for sale by delisting the units, unless the sale has been already completed and the internal ownership records of the units have therefore already been updated to reflect new ownership of the units by the buying user, or tax lien has been redeemed, or tax lien redemption period has expired and the property foreclosure process has been completed.

Preferably, the selling user can have an option to sell tax lien units immediately to the operating entity at any time, where the minimum price paid to the selling user by the operating entity for such tax lien units will be based on the initial price of the tax lien.

Preferably, when the tax lien has been entered into the system, a corresponding record will be automatically created through the liquidation system module, where the property backing the tax lien will be listed for sale via a property liquidation area of the user interface at a price equivalent to property value less a discount that has been previously configured by the operating entity, and where conditions of such sale are that the prospective buyer agrees to wait for expiry of the redemption period and completion of the foreclosure process and agrees to accept cancellation of the property sale if users that own fractional units of the tax lien at the completion of the foreclosure process vote not to sell the acquired property title, or if the tax lien is redeemed during redemption period.

Preferably, when a prospective property buyer agrees to buy listed property based on the liquidation listing, the price agreed for sale of such property becomes a new property value recorded for the tax lien listed for trading in the system.

In one embodiment, upon tax lien data being recorded in the database and a tax lien record configured in the system to be listed for trading, the system will display all such tax liens in a browsable list in the user interface, and a single displayed tax lien unit price for each tax lien is a calculated average price of all the units of that respective tax lien.

Preferably, the tax lien listing displayed for tax liens listed for sale will also show the fair tax lien secondary market price as a point of reference, where such price is calculated by the centralized computer system.

Preferably, the calculation method for determining the tax lien secondary market price will include steps of using a formula with at least following values: the tax lien initial price; the property value of the property backing the tax lien; the subsequent taxes and fees cost; the tax lien interest rate paid on initial price; tax lien final bid cost; the property sale tax rate; the tax lien redemption period; and odds of tax lien being redeemed during the redemption period, where such odds can be based on historical data related to region, property type, risk-related parameters such as a remaining length of the redemption period, tax payment history on the property, and such other relevant parameters.

Preferably, the tax lien record listed in the system based on the data previously saved in the database, when displayed via user interface, should allow users (preferably both the buying and selling users) to see at least following elements: a number of units in each tax lien; a number of units currently offered for sale; an end date of the redemption period; the tax lien initial price; the tax lien property value; the subsequent taxes cost; the tax lien interest rate; a length of the tax lien redemption period; tax lien property location; current price of the tax lien unit(s) based on prices set by the selling user(s).

In one embodiment, in order to buy tax lien or a fraction of tax lien (units), the buying user will access, via the user interface, a tax lien records listing including tax liens that are configured as listed for trading and have number of units set for sale with the unit price previously inputted by the selling user. By using the user interface, the buying user will select a tax lien that they are intending to buy, where the user interface will present option for the buying user to specify a quantity of units they are buying. The amount of units inputted by the user is submitted to centralized processing computer for final cost calculation, at which time the logic within centralized computer will calculate the final cost based on the specified quantity of units and the price of the units listed for sale, where the cheaper priced units (when sets of units are listed at different price) will first be added to a group of units to be purchased, followed by next more expensive units, until total amount of units in the group equals the quantity specified by the buying user for purchase. The resulted total cost and break down of differently priced units will be presented to the buying user via user interface along with an option to confirm the transaction. The buying user will confirm the transaction, at which time the units record is amended to transfer the group of units from the ownership portfolio of the selling user's account to the ownership portfolio buying users account, with all such changes processed by the centralized processing computer and recorded in the database under data storage and backup facility. After the purchase transaction is completed, the units purchased by the buying user are no longer listed for sale.

Preferably the step of buying tax lien will include funding of the transaction by the buying user through conventional or electronic payment methods, where such funds will be allocated from the buying user's financial account and transferred to the selling user's financial account once the transaction is completed.

Preferably any steps where buying users are required to enter quantity of units for a transaction, such quantity can be entered as actual number of units or as a sum of money to be spent on acquiring available units, where depending on one variable entered, the other is updated to reflect respective equivalent value immediately. So as an alternative to specifying a particular number of units to purchase, the buying user can specify a dollar amount that they wish to spend on units of a selected lien, and the central computer will calculate and display the number of units purchasable for that amount. In one embodiment, priority is given to lower cost units, if there are differently priced units listed for that lien, thereby maximizing the number of units acquired for the specified dollar amount.

Preferably all transactions will include a step of recording buying and selling transactions processed under different users, and at minimum will include data about the subject tax lien and the number of units bought or sold, and a date of the transaction.

In one embodiment, when the tax lien is being redeemed in accordance with terms of the tax lien, the operating entity will set the system to enforce cancellation of all current sale offers listed by the users, and will force the users that currently own such tax lien units to sell the units to the operating entity at the initial tax lien unit price, plus interest (if any) earned on the original tax lien price in relation to such units and configured to be passed on users.

In one embodiment, when in accordance with tax lien terms the tax lien redemption period has expired, and foreclosure or other subsequent processes required by the jurisdiction in question have been completed, and possession of the property title by the operating entity must proceed, the operating entity will set the system to enforce cancellation of all current sale offers listings by the users, and will set the tax lien record in the system as concluded.

Preferably, once the tax lien status has been set as concluded, the users owning units in such tax lien will follow an additional step where each such user will be presented with an option to vote on whether they elect to have joint (when more than one user owns units) ownership of the property that the operating entity acquired title for, or prefer to sell the property for cash value.

Preferably, the operating entity would handle all legally required procedures, such as tax lien redemption or acquisition of property title, on behalf of the users directly with the issuing authority, as the operating entity retains the official registered ownership of the tax lien throughout the entire process, with the trading of tax liens and units thereof being effected only internally of the system without changing the official registered ownership status with the issuer. And when relevant documents are acquired through such process, preferably the operating entity will have an option to digitally store such documents in a manner attached or linked to the relevant concluded tax lien record, and the users can access such documents for viewing through the user interface.

Preferably, when a tax lien resulted in property title acquisition by the operating entity, and the respective users voted to have joint ownership of the property, the record for such property is created in the real-estate management sub-system with an option to either use the operating entity or a third party agent for property rental, or request another vote on whether to sell the property, in which case a majority vote for selling the property will result in creation of a record in the liquidation sub-system for listing the property for sale in the liquidation sub-system, for example at a reduced price with based on a discount (if any) specified by the user-owners of the property.

The system performs a unique process previously unseen in the prior art, enabling users to buy or sell tax liens on a secondary market marketplace that can be accessed globally through the use of a communications network and use of a computer system capable of providing a real-time estimate of a fair price of each tax lien that fluctuates over time, as well as electronically manage full or partial ownership of such tax lien and the lifecycle of the tax lien, which without the computerized solution proposed herein would be otherwise be incapable of providing accessibility to remote global users, handling tax lien redemption, property title acquisition and subsequent management or liquidation of such acquired property.

According to one aspect of the invention, there is provided a system for trading property tax liens and determining property tax lien current value, the system comprising a terminal used to input parameters related to tax liens and connected to a centralized computer system which calculates a fair value for a tax lien or fractional portion of said tax lien by applying a calculation method based on system parameters and input parameters inputted by the users and saved in a data backup and storage facility; an interface used to present the determined fair value to the users over communication network and register trades between users of tax liens or fractional units thereof with the centralized computer system over the communication network, whereupon registered records of said trades are stored in the data storage and backup facility along with the input parameters previously inputted by the users, as well as digital copies of documentation about the tax liens and related properties.

Preferably, the input parameters related to tax lien recoded in the system must contain at least a tax lien initial price; a tax lien property value; a subsequent taxes and fees value; a tax lien interest rate; tax lien final bid amount; property sales tax rate; tax lien redemption period; tax lien currency.

Preferably, the input parameters related to buying or selling a tax lien recorded in the system must contain at least a tax lien unit selling price entered by the selling user (which in some instances, is the operating entity).

Preferably, the input parameters related to configuration of tax lien recorded in the system, for example as inputted by the operating entity or other authorized entity, must contain at least the number of units into which the tax lien is to be divided; a predefined adjustment amount to be applied to the automatically calculated fair market price; a cap restriction on unit price; and a portion of the tax lien interest passed on the user. In the preferred embodiment, these parameters can be uniquely entered for each tax lien, as opposed to being global parameters applied universally to all of the tax liens.

Preferably, the system provides an option for the operating entity to define whether an entirety or partial portion, or no portion, of the tax lien interest (if any) will be credited to users when sale of tax lien units is enforced due to tax lien redemption.

Preferably the centralized computer system is connected with the data storage database, into which the centralized processing computer system stores the input parameters that are received via terminal and interfaces.

Preferably, the system will also create a corresponding record with the details of the property backing the tax lien, as previously entered in the system by the operating entity, and display such property as listed for sale via a liquidation sub-system area of the user interface at the liquidation price equivalent to the property value less the discount specified by the operating entity, and capture a prospective buyer's acceptance of conditions on the sale, including waiting for the expiry of the tax lien redemption period and following foreclosure and title transfer process and waiting for the outcome of a property ownership/sale vote between the users that own the tax lien on the property before the sale is completed, and agrees to accept cancellation of sale if tax lien has been redeemed during redemption period or if the voting users elect to own the property themselves in the property ownership/sale vote. Preferably the system will automatically adjust a property value that is recorded for any tax lien listed for trading in the system to the value of price agreed for sale of such property in the liquidation sub-system when a prospective property buyer agrees to buy such listed property. Accordingly, calculation of the fair secondary market price of the tax lien is updated in real time based on the agreed price for the conditional sale in the liquidation sub-system module.

According to yet another aspect of the invention there is provided a system for calculating a secondary market price of the tax lien and using such results as a point of reference for system users buying or selling tax liens. While using standard financial terms tax lien has many properties of a derivative instrument, including maturity date, principal price and a coupon, it also includes a unique underlying asset and embedded callable option. Therefore, the system uses a mathematical equation where the fair secondary market price of the tax lien will vary depending on remaining period for tax lien and odds of early redemption from the buyer, for example, the formula employed can be $C=PTz+a$, where P is the potential profit of the tax lien, for example calculated as estimated real estate value less full cost of the tax lien (including all subsequent taxes, if any, known upfront) divided by the length of the redemption period, T is a function representing the remaining time period between expiry of the tax lien redemption period and the current time, z is the odds of early redemption, which can be calculated using any existing simple or complex probability calculation method, and a is the initial cost (upset price) of the tax lien that was paid at the time of purchase from the issuing authority.

Preferably the adjustment amount, if defined, will be subtracted from the fair market price that resulted from the formula.

Preferably the price cap percentage, if defined, will be applied to the fair market price that resulted by using the formula, where if the difference between the original price and resulted price exceeds the percentage specified in cap, the resulted price will be set to a maximum that does not exceed the specified cap. The adjustment amount and/or price cap can thus be used by the operating entity to compensate for inaccuracies of the fair market value formula, which may vary from one tax lien to another, for example based on such factors as the jurisdiction of the tax lien, the type of property, etc.

Employing the same principles, the system can use other fair market value formulas adaptable based on different types of rules and properties of tax liens inputted in the system.

Preferably the system will present the secondary market price estimate to the users as point of reference guiding buying or selling tax liens and otherwise allow free market trade. Alternatively, the resulted secondary market price can be used as a cap or restriction limit in the system to automatically control buying and selling prices range.

According to yet another aspect of the invention there is provided a system for displaying tax liens listed for sale via a user interface, calculating a tax lien or fractional tax lien unit price and charges (if any) through centralized computer system, registering buying and selling of tax liens or fractional units thereof and storing such data, as well as related documentation in digital format, in the database under data storage and backup facility.

Preferably the system will present current price of the tax lien via user interface updated in real-time, where such price immediately reflects changes to average price based on trades registered for such tax lien and changes in current fair value calculated by the system. In other words, in the event of a tax lien unit purchased by a buyer from a seller, the purchase price of that unit is used as the 'current price' of the unit used in recalculation of the average unit price and the fair market value (where the current price is used in the determination of potential profit P).

Preferably the system will have a document viewing area in the user interface for display of the digital copies of tax lien documentation (if any available) as part of the tax lien record.

Preferably the system will allow buying user to enter number of units representing portion of tax lien they are intending to buy, or an amount of currency they are intending to pay that will be automatically converted by the system into amount of units that the user can buy for that specified amount.

Preferably the initial price of the tax lien will be considered by the system as guaranteed price of such tax lien. Likewise, an initial unit price, calculated as the initial tax lien price divided by the number of units into which the tax lien is divided, represents a guaranteed price of a tax lien unit for which a user can sell the tax lien unit to the operating entity.

Preferably the system will allow users who own a tax lien or a portion of the tax lien to sell all or few units that they own to the operating entity at the guaranteed price.

According to yet another aspect of the invention there is provided a system for managing portfolio of records of one or more tax liens or portions of tax liens owned by a user and displayed via user interface where record parameters, such as fair market value and current average unit value, are updated in real-time.

Preferably, the parameters related to a tax lien displayed under a user portfolio must contain at least the number of units owned by the user; a total number of units in the entire tax lien; and the current tax lien unit price.

According to yet another aspect of the invention there is provided a system for viewing historical records of transactions performed under user's account buying, selling tax liens or portions of tax liens, depositing, withdrawing, or transferring funds within the account and displayed via user interface where each such record has been previously saved in the database under data storage and backup facility.

Preferably, the parameters related to records displayed under transactions history must contain at least the date, description and amount of the related transaction.

According to yet another aspect of the invention there is provided a system to deposit or withdraw funds in real-time using electronic payment systems and record such transactions in the database under data storage and backup facility.

Preferably, the system will be configured to support multiple payment providers, including but not limited to credit card gateways, electronic currencies and other payment systems that are capable of processing payments in real-time or close to real-time manner.

According to yet another aspect of the invention there is provided a system for operating entity to enter parameters using the administrative interface and force the users that currently own a particular tax lien units to sell units to the operating entity at a proportional amount of the original tax lien (face value) price in relation to such units, plus interest (if any) earned on the original tax lien unit price in relation to such units and to enforce cancellation of all current sale offers listings by the users.

According to yet another aspect of the invention there is provided a system for operating entity to enter additional parameters for a particular tax lien using the administrative interface and force the system to cancel all current sale offers listings by the users for such tax lien, and save such tax lien record as concluded.

According to yet another aspect of the invention there is provided a system for users, who own units in the tax lien with concluded status (i.e. resulted in acquisition of property title), to use an option to submit a vote indicating if they elect to have joint (when more than one user owns units) ownership of the property that they acquired title for, or they prefer to sell the said property for cash value.

Preferably, the system will be configured to calculate votes based on the majority, where a number of votes accorded to each user is equivalent to number of units held by the user, and where all voting results are recorded and stored in the database in data backup facility.

Preferably, the system will automatically create the record for the property in the real-estate management sub-system with a property management area of the user interface available for the users in a joint ownership scenario to specify use of the operating entity or a third party agent for property rental services, or to request another vote on whether to sell the property in cases where the tax lien resulted in property title acquisition and the users previously voted to share joint ownership of the property. In case of a majority vote to sell the property, the system will create a record in the liquidation sub-system with property listed for sale at a price with a discount (if any) entered by the joint-owners of the property.

According to another aspect of the invention, there is provided a computerized system for executing buying and selling transactions for tax liens or fractions of tax liens via communications network, the system comprising: (a) a user interface which enables each of a plurality of users to input parameters for offering a sale of a tax lien or fraction of a tax lien, and input parameters confirming buying of a tax lien or a fraction of a tax lien; (b) a data storage database for storing the input parameters inputted by the users and a table for open orders to sell tax liens or fractions thereof; (c) central processing computer system operating or interacting with the user interface, connected with the data storage database and configured to: (i) receive communication from administrative users containing details about each tax lien and a respective property backing said tax lien; (ii) receive communications from users containing the input parameters for buying and selling the tax liens or fractions thereof; (iii) for each tax lien, calculate a fair secondary market value; (iv) for each transaction, update tax lien or fraction of tax lien ownership record in the database; and (v) for each tax lien property, display a respective record in property liquidation sub-system offering users an opportunity to become a prospective buyer for said property.

Preferably the central processing computer system is further configured to, upon receipt of a conditional purchase offer from one of the users for a subject tax lien property of one of the records in the property liquidation sub-system, update a property value stored in the database for said subject tax lien property according to a dollar amount of said conditional purchase offer, recalculate the fair secondary market value in real time based on said updated property value, and display the recalculated fair secondary market value to at least one of the users in the user interface.

Preferably the central processing computer system is further configured to calculate a respective average unit price for each of a plurality of tax liens that have been divided into fractional units and, upon purchase of one of said fractional units of one of said plurality of tax liens by one of the users, calculate an updated value of the respective average unit price of said one of the plurality of tax liens in real time using a purchase price at which said one of the fractional units was purchased by said one of the users, and display the updated value of the respective average unit price to at least one of the users in the user interface.

Preferably the central processing computer system is further configured to, for each of the plurality of tax liens, display the respective average unit price as a sole unit price indicator for said tax lien in the user interface.

Preferably the central processing computer system is further configured to, upon receipt of a purchase request for a plurality of fractional units of any one of the plurality of tax liens from any one of said users, select a group of said fractional units to be sold to said any one of said users based on a prioritized ranking of available fractional units from lower cost fractional units to higher cost fractional units so as to maximize a quantity of fractional units purchased in said group, and update ownership information in the database for said group of fractional units to reflect the purchase thereof by said any one of said users.

Preferably the central processing computer system is further configured to, for one of the tax liens divided into a plurality of fractional units and recorded as being owned by a plurality of the users in the ownership record of said one of the tax liens, after expiry of a redemption period of said one of the tax liens and subsequent completion of a foreclosure process, automatically delist the respective record from the property liquidation subsystem and present said plurality of the users with selectable voting options in the user interface, including a joint ownership option under which said plurality of the users share ownership of the respectively property backing said one of the tax liens and a liquidation option under which said respectively property is listed for sale in the liquidation sub-system, receive voting option selections from the plurality of the users through the user interface, tally a vote outcome based on the received voting option selections, and relist the respective record within the property liquidation subsystem if the vote outcome favors the liquidation option.

Preferably the central processing computer system is further configured to present a sub-option of the joint ownership option, under which an entity other than said plurality of the users is appointed as a rental agency for renting the respective property to one or more tenants.

Preferably the central processing computer system is further configured to use time in the calculation of the fair secondary market value, to recalculate the fair secondary market value for each tax lien on an ongoing basis and to update a display of the fair secondary market value within the user interface in real time.

Preferably the central processing computer system is further configured to, after receipt of an input indicative of redemption of one of the tax liens, identify one or more of the users from the ownership record of said tax lien, transfer payment from an account of an operating entity of the system to one or more accounts of said one or more users in an amount equal to a guaranteed tax lien value stored in the database for said one of the tax liens, and update the ownership record of said one of the tax liens to reflect transfer of said one of the tax liens from said one or more of the users to said operating entity.

It will be appreciated from the forgoing that the computer system is an essential part of the invention, without which real time calculation and updated real time display of values that vary over time (fair secondary market unit value, average unit price) would not be possible to provide every user with up to date accurate information for use in considering purchase of available units and determining a suitable asking price for units to be listed for sale.

According to another aspect of the invention, there is provided a system for determining a tax lien fair price on a secondary market and providing said tax lien fair price to users of said secondary market, the system comprising a central processing computer configured to present, or communicate with, a user interface which enables one or more administrators to enter parameters of tax liens and enables the users of the secondary market to browse a collection of tax liens available for purchase in said secondary market and/or add tax liens to said collection of tax liens available for sale; wherein the central processing computer is further configured to, for each tax lien: (a) calculate a potential profit of the tax lien using the parameters entered by the one or more administrators; (b) calculate a remaining time period between an expiry of the tax lien and the current time; (c) calculate odds of an early redemption of the tax lien using probability calculation methods; (d) calculate a current fair price of the tax lien using a, b, and c above; (e) display the current fair price to one or more of the users via the user interface as a reference point for comparison against an asking price of one of the tax liens available for purchase or use in determining a suitable asking price for a tax lien to be added to the collection of tax liens available for sale.

Preferably the central processing computer is further configured to recalculate the current fair price on an ongoing basis and update the current fair price in real time in the user interface to provide the users with an up to date point of reference.

According to yet another aspect of the invention, there is provided a system for facilitating management or liquidation of a property for which a tax lien has resulted in acquisition of a title of said property, the system comprising: (a) a central processing computer system connected to a communications network and operating, or interacting with, a user interface to register instructions received over the communications network from a plurality of users each having a respective fractional ownership stake in said tax lien; (b) a property management module of the central processing computer system utilizing the user interface to receive input parameters from the plurality of users for casting votes proportional to their respective fractional ownership stakes on whether to sell the property or rent the property out to one or more third parties; (c) a property liquidation module of the central processing computer system utilizing the user interface to receive one or more bids from one or more prospective buyers of the property; (d) a data storage database connected with the central processing computer system for storing the input parameters inputted by the users and a table for storing details of the property; wherein the central processing computer system and the management and property liquidation modules are configured to: (i) receive communications over the communications network from the plurality of users containing the votes on whether the sell or rent the property; (ii) receive one or more communications over the communications network containing the one or more bids from the one or more prospective buyers; (iii) subject to a voting majority for rental of the property from the plurality of users in step i, receive incoming communication from administrative users containing maintenance costs and rental income on the property; and (iv) send outgoing communications on the maintenance costs and rental income to the plurality of users for display thereto in the user interface.

According to another aspect of the invention, there is provided a computer implemented method for executing buy and sell transactions for tax lien or fractions of tax liens, the method comprising the following steps performed by a central computer system that is connected to a communications network: (a) receiving communication from an administrative entity or tax lien issuer containing information about a tax lien; (b) creating and storing a record of the tax lien and splitting the tax lien into fractional units based on a division value specified by the administrative user; (c) creating and storing a record with details of a property backing the tax lien, and listing such property within a property liquidation list; (d) receiving an instruction to create an open sale order for one or more of the fractional units of the tax lien, and based thereon, adding said tax lien to a list of tax liens for which units are available for sale; (e) making the list of tax liens accessible to users; (f) receiving a purchase communication from a buyer confirming purchase of a subject tax lien or fractional unit thereof; (g) changing an owner record of the subject tax lien in the system to reflect ownership of said subject tax lien or fractional unit thereof by the buyer; (h) receiving communication from the tax lien issuer that either the subject tax lien has been redeemed, or a property foreclosure process has been initiated in association with the subject tax lien; (i) identifying any users having an ownership stake in the subject tax lien based on the ownership record of the subject tax lien, and sending communication to said any users reporting on the tax lien redemption or foreclosure initiation for said subject tax lien.

Preferably there is provided a further step, performed by the central computer system, of transferring a settlement amount of the tax lien to a respective financial account of each of said any users based on a fractional portion of a either a redemption value or property sale profit of the tax lien, said fractional portion being calculated proportionally to the ownership stake of said each said any users.

Preferably there is provided an additional step of, before step d, assigning an actual tax lien ownership record of the tax lien issuer to the operating entity responsible for managing the system.

Preferably there is provided an additional step, performed by the central computer system, of registering prospective property buyers and receiving and storing offer prices from said prospective property buyers for the property backing the tax lien.

Preferably there is provided an additional step of buying any tax lien or fraction of tax lien offered at initial price to the operating entity by the user owner such tax lien or fraction of tax lien.

According to yet another aspect of the invention, there is provided a computer implemented method facilitating management or liquidation of a property backing a tax lien, the method comprising the following steps performed by a central computer system that is connected to a communications network: (a) receiving communication from potential property buyers with respective offer prices on said property, and registering each offer price in the system for comparison of the offer prices against one another; (b) determining a winning prospective buyer based on said comparison of the offer prices against one another, and sending a win confirmation communication to the winning prospective buyer confirming they have won; (c) receiving vote communications from a plurality of users having shared ownership of said tax lien, the vote communications containing votes of said plurality of users on keeping or selling the property; (d) determining a vote outcome based on a proportion of the tax lien owned by each of the plurality of users and assuming a sell-off vote in favor of selling the property for any of said plurality of users that failed to vote in step c.

Preferably step (d) comprises determining the vote outcome to be in favor of keeping the property, and the method further comprises step e of sending outgoing communications on maintenance costs and rental income for the property to the plurality of users.

Preferably there is provided an additional step, performed by the central computer system, of presenting the plurality of users with an option to initiate a further subsequent vote on whether to keep or sell the property.

The present invention and its features and advantages will become more apparent from the following detailed description with reference to the accompanying drawings.

BRIEF DESCRIPTION OF DRAWINGS

FIG. 6 schematically illustrates a partial screenshot from a tax lien browsing mode of a user interface of the system, in which a potential buyer can browse tax liens for which units are available for purchase from an operating entity and/or other users of the system.

FIG. 7 schematically illustrates a screenshot from a portfolio viewing mode of the user interface, in which a user can view information on tax liens for which the user owns one or more units.

DETAILED DESCRIPTION OF THE INVENTION

Figure 1:
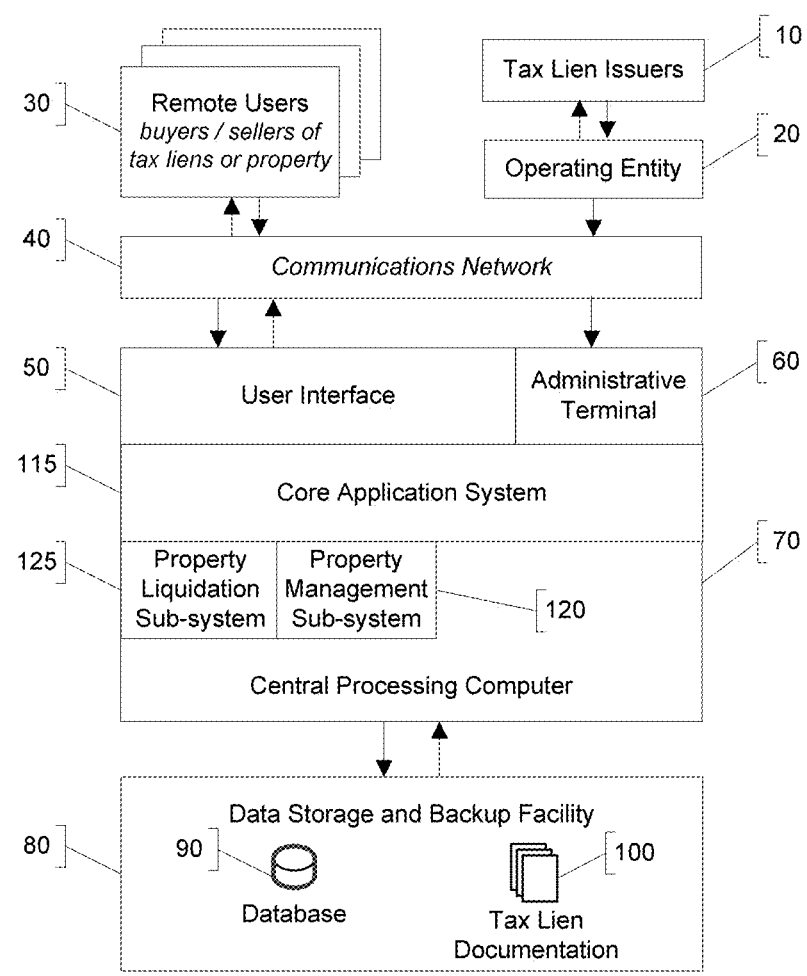
FIG. 1 is a block diagram showing a system for buying and selling property tax liens and determining tax lien fair value and price on a secondary market according to an exemplary embodiment of the present invention.

FIG. 1 shows an overview of an exemplary system for buying and selling property tax liens and determining tax lien fair value on a secondary market. Parties involved in use of the system include an Operating Entity 20 acting individually or representing one or more Tax Lien Issuers 10, and a plurality of Remote Users 30 looking to trade on the secondary market. A Central Processing Computer 70 has a processor, and computer readable memory coupled thereto and having stored thereon one or more computer programs having statements and instructions for execution by the processor that, when executed, enable each of the parties to exchange electronic communications with the Central Processing Computer 70 by means of the Communications Network 40 in order to interact with a core application system 115 that is connected to or installed on the central processing computer 70, whereby the parties can engage in buying and selling of tax lien certificates or fractions thereof, receive tax lien redemption settlements, and access processes facilitated by Property Management Sub-system module 120 and Property Liquidation Sub-system module 125 to obtain, manage or liquidate a real-estate property that has been obtained via tax lien. The Administrative Terminal 60 accepts parameters related to the tax lien data from the Operating Entity 20 and distributes data to the Central Processing Computer 70 that facilitates processing steps (in the processes described below) related to assignment of tax lien ownership in the system 140, calculating an estimated or fair secondary market price of a tax lien 150, creating listing of real-estate property backing the tax lien 130, store all input parameters received from Operating Entity 20 in the Database 90 together with digital copies of tax lien documentation (when provided) 100 under Data Storage and Backup Facility 80. User Interface 50 accepts parameters related to the transactions with tax liens and real-estate properties backing the tax liens from the Remote Users 30 and distributes data to the Central Processing Computer 70 that facilitates processing steps (in the processes described below) related to listing of the tax lien for trading in the system 190, capturing offers for auction or tender 160 for such property 130, record new property value and recalculate the fair secondary market price of tax lien 180, record sale of the tax lien at guaranteed price 210, record an offer for sale of the tax lien at the marketplace 220, record a new owner of the tax lien or an additional owner of a fractional unit of the tax lien 260, record redemption of tax lien 360, record sale of real-estate property received via tax lien 340, store all input parameters received from Remote Users 30 in the Database 90 under Data Storage and Backup Facility 80.

Figure 2:
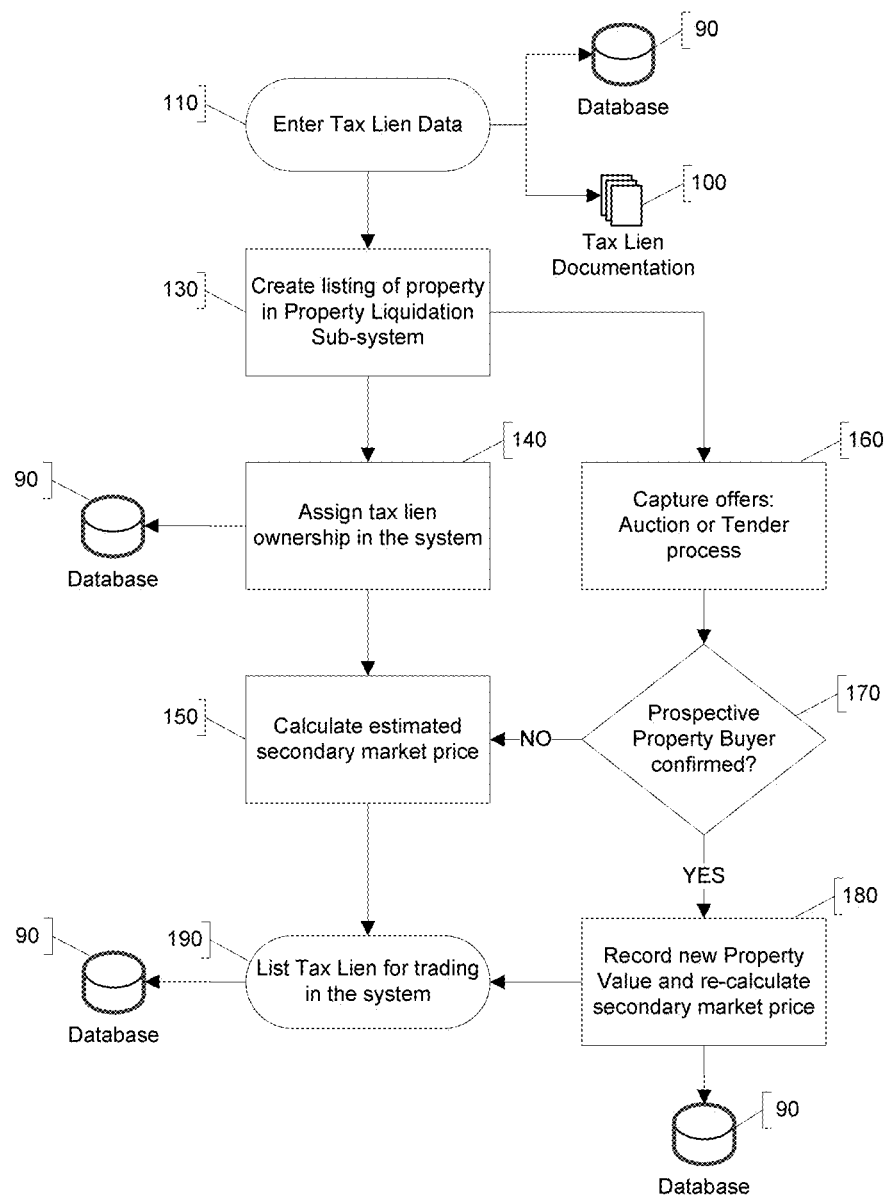
FIG. 2 is a flowchart diagram showing an exemplary process flow for entering tax lien parameters, determining tax lien fair value and listing it for trading on secondary market in the system for buying and selling property tax liens and determining tax lien fair value and price on a secondary market.

The core application system 115 of the Central Processing Computer 70 manages the overall system by calling on the Property Management Sub-system and Property Liquidation Sub-system and accessing the database. As will be explained further below, the central processing computer 70 uses the elements described above to enter tax lien data 110 in the system, determine estimated fair price for secondary market 150 and list such tax lien in the system 190 for Remote Users 30 to access. In brief, the process presented in FIG. 2 of the exemplary embodiment is as follows:

The Operating Entity 20 has a stock of tax lien certificates supplied by the Issuers 10 who have a need to sell them, and in order to do so, Operating Entity 20 inputs tax lien details for each tax lien via Administrative Terminal 60, or enables Issuers 10 to input tax lien parameters via Administrative Terminal 60 or by integrating Administrative Terminal 60 with the Issuer's 10 own system to provide at least following parameters: the tax lien initial price (also known as upset price or base value); the property value of the property backing the tax lien; the subsequent taxes and fees cost (if any); the tax lien interest rate (if any) paid on the initial price by the issuer; the tax lien final bid cost (if different than the tax lien initial price); the property sale tax rate; the tax lien redemption period and the tax lien currency. Additionally to entering the above parameters Operating Entity 20 optionally submits digital copies of documents related to the tax lien.

Subsequently the Operating Entity 20 configures at least the following controls for each tax lien previously entered via Administrative Terminal 60: setting a unit division quantity for fractional division to determine number of units (fractions) in tax lien (e.g. 100); setting an adjustment amount for automatically calculated price where such amount will be added (if positive) or subtracted (if negative) from the calculated secondary fair market price; a cap restriction on the calculated secondary fair market price where such amount expressed in percentage does not allow the automatically calculated price to exceed the cap (e.g. a cap restriction of 40% will default the fair secondary market price to 140% of the initial price if the calculated fair secondary market price exceeds this amount); a discount of property price used for liquidation listing, where such amount is expressed as percentage or dollar amount that will be subtracted from the property value (e.g. property value less 20%); and a portion of the tax lien interest passed on the Remote Users 30 where such amount expressed in percentage applied to net interest paid on the tax lien (in case of redemption) will be allocated to Remote Users 30 and remaining amount will be allocated to Operating Entity 20; and a specific Remote User of the system whom tax lien ownership must be allocated to in the system records if the tax lien being entered into the system at this time is one that was issued to a remote use, rather than to the operating entity, but the issuer.

Based on the above parameters, the Central Processing Computer 70 simultaneously or concurrently executes following operations: creates a listing of the real-estate property backing the tax lien in Property Liquidation Sub-system module 130 where such listing is presented to Remote Users 30 accessing the Property Liquidation Sub-system module 130 via User Interface 50; records tax lien ownership in the system to the Remote User specified by Operating Entity 20 (if any); calculates the estimated/fair secondary market price by using a formula stored in the system, which in one example may be C=PTz+a, where P is the potential profit of the tax lien, calculated as estimated real-estate value less full cost of the tax lien (including all subsequent taxes, if any, known upfront), divided by the length of the redemption period, T is the remaining time period between the expiry of the tax lien redemption period and the current time, z is the odds of early redemption that can be calculated using any existing simple or complex probability calculation methods, and a is the initial cost (upset price) of the tax lien that has been paid at the time of purchase; lists the tax lien on the marketplace list showing at least the following parameters for each tax lien listed therein: the tax lien initial price (also known as upset price or base value); the property value of the property backing tax lien; the subsequent taxes and fees cost (if any); the tax lien interest rate (if any) paid on the initial price; the tax lien final bid cost (if different than the tax lien initial price); the property sale tax rate; the tax lien redemption period and the tax lien currency. The marketplace list is made accessible by Remote Users 30 via User Interface 50. In this way two main records now exist for each tax lien: (1) the actual tax lien listed in the system for trading 190, and (2) the real-estate property backing tax lien listed in the liquidation offer list 130.

An illustrative example of use of the formula C=PTz+a to calculate a fair secondary market price is presented as follows. A tax lien is issued against a property valued at $100,000 for unpaid taxes in the amount of $600. The tax lien has an interest rate of 10% per year and a redemption period of 24 months. It is known that the yearly property tax is approximately $1,000 per year. The foreclosure cost of the property (which in some cases may be known at the time of issue of tax lien) that will be paid by tax lien holder for the property is known or estimated to be $30,000. In this example, assume that 10 months of the redemption period have already passed, the odds of the tax lien being redeemed by the property owner prior to the expiry of the redemption period are determined based on one or more criteria, such as historical tax lien redemption data, property type, property owner information, etc. Therefore, applying the above formula:

$P=(\$100,000-\$30,000-(\$1,000\times 2))/24$ $T=24-10$ (calculated in real time)

$z=100\%-99.5\%$ $a=\$600$ $C=\$2,834\times 14\times 0.5\%+\$600=\$798$

The fair secondary market value of this tax lien after 10 months is therefore found to be $798. The fair secondary market tax lien value C is divided by the number of units into which the tax lien has been divided, thereby determining a fair secondary market unit value. If the tax lien has not been divided into multiple units, then the number of units is one, whereby the fair secondary market tax lien value and the fair secondary market unit value are the same. The variable T will change in real time, variable z will change as conditions change, and variable P will change if additional costs involved with property become known, and are entered into the system. Accordingly, the fair secondary market unit value is recalculated on an ongoing or periodic basis, and the updated value is displayed within the user interface for comparison by any buying user against the asking price of a listed unit they are considering for purchase, and for use by selling users in determining the asking price for units they want to list for sale.

With the present invention it is also possible that once the real-estate listing is created under the Property Liquidation Sub-system 130, the Remote Users 30 can bid (optionally, if interested) on such property through the auction or tender, or such other similar processes where highest bidder is determined and confirmed 170 based on an auction period of time configured by the Operating Entity 20. Confirming such bidder willing to buy property backing tax lien results in Central Processing Computer 70 recording a new updated property value, where the price that winning bidder agreed to pay becomes new property value price, and the fair secondary market price of the tax lien 180 is accordingly recalculated in real time. In this way, when a property is obtained via the respective tax lien, the user holding such tax lien already has a confirmed prospective buyer for the real estate.

Figure 3:
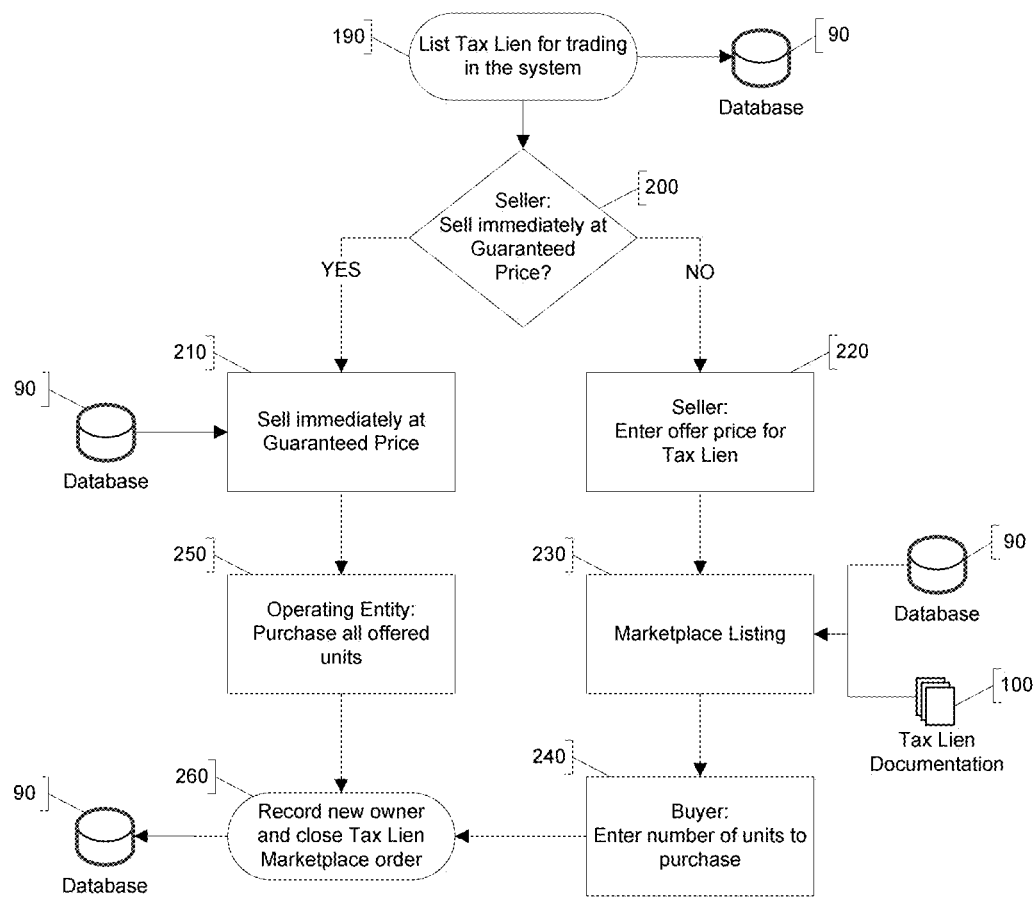
FIG. 3 is a flowchart diagram showing an exemplary process flow for buying and selling tax liens in the system for buying and selling property tax liens and determining tax lien fair value and price on a secondary market.

The Central Processing Computer 70 also uses the elements described above and the User Interface 50 to record buy and sell transactions for the tax lien or fractions of such. The process presented in FIG. 3 of the exemplary embodiment is as follows:

Once a tax lien is listed in the system for trading 190, the Remote User 30 that has ownership of the tax lien assigned to them 140 may select from two options 200 available to sell their tax lien, or fractions of such: (1) sell immediately at guaranteed price 210, in which case the previously inputted initial/upset price is retrieved from the Database 90 and used to record a sale 250 from the subject user to the operating entity, with the tax lien units thus being assigned back 260 to the Operating Entity 20 within the internal records stored in the database, (2) post an open order with an offer or asking price 220 to be displayed in the tax lien marketplace listing 230 together with the other details about the tax lien, as retrieved from the Database 90, and digital documentation (if any) 100 that has been previously submitted about the tax lien. The Remote User 30 that is willing to buy the tax lien, or one or more units of such, can enter the number of units to buy and then confirm purchase 240, at which time the ownership is assigned to the user making the purchase and the selected number of purchased units is subtracted from the open order 260.

In one embodiment, prior to entering tax lien unit asking/offer price for an open order, the user can see the recommended fair value price 150 estimated as described above and use such price as point of reference.

Figure 4:
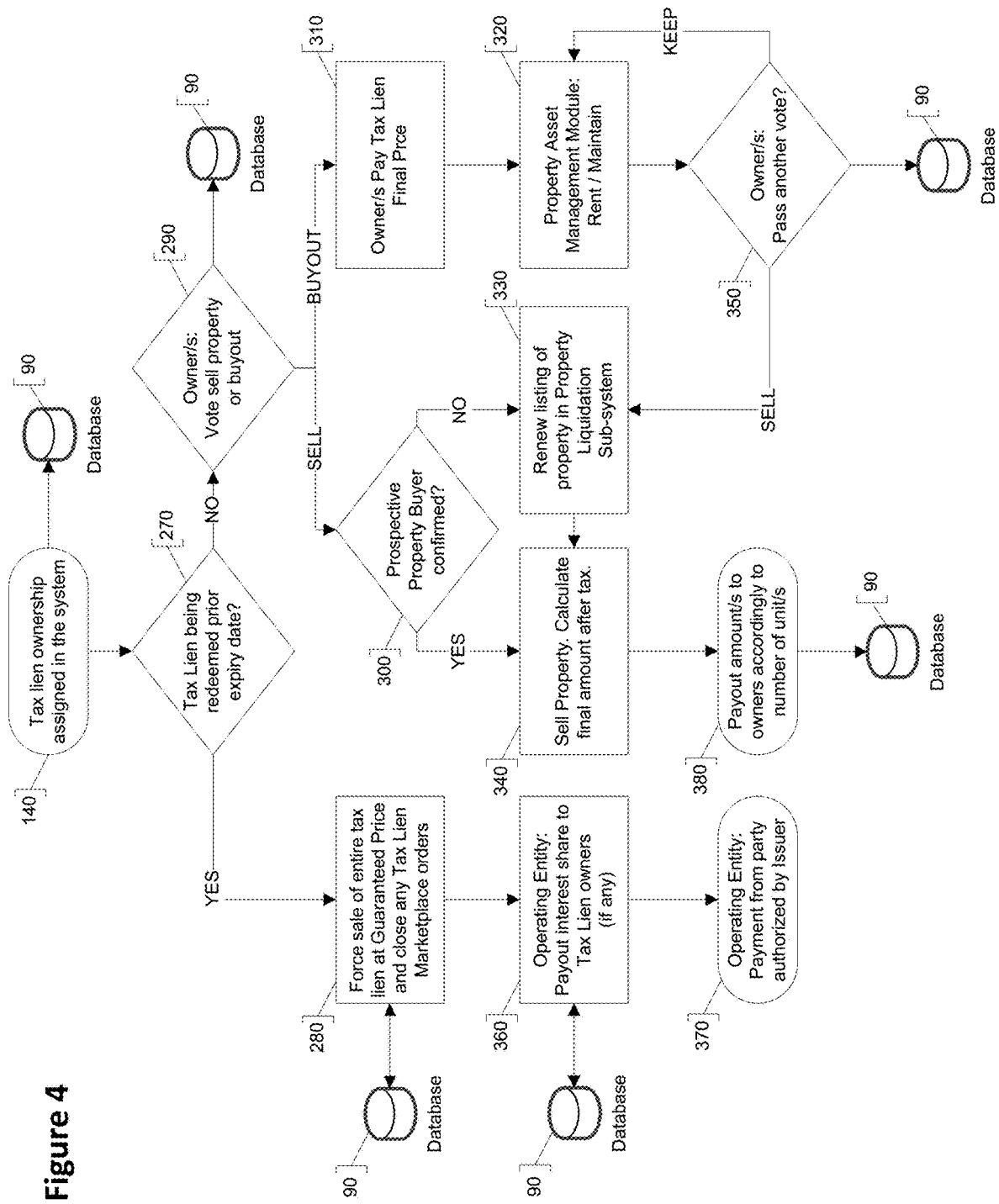
FIG. 4 is a flowchart diagram showing an exemplary process flow for tax lien redemption, property liquidation selling and property management in the system for buying and selling property tax liens and determining tax lien fair value and price on a secondary market.

The system allows a single tax lien to be assigned to multiple users, and each such user having multiple units of the same tax lien may further sell his/her units to one or more other users. When specific tax lien is redeemed, or when a real-estate property is obtained via foreclosure proceedings on a specific tax lien, the process presented in FIG. 4 of the exemplary embodiment is as follows:

When a tax lien is redeemed prior to redemption end date 270, the Central Processing Computer 70 extracts the tax lien details from the Database 90 and calculates a new guaranteed price (principal price plus interest) of the tax lien, where such price is then saved back to the Database 90. Subsequently all units in tax lien are automatically sold 280 back to Operating Entity 20 at guaranteed price. This way the Remote Users 30 that are holding units in the redeemed tax lien receive redemption portion by selling units to the Operating Entity, and the Operating Entity pays out all or part of the redemption settlement amount 360 that it has received 370 from the Issuer 10 in exchange for such units.

When a tax lien has not been redeemed, and foreclosure of the property has been completed (through means outside the system of the present invention), resulting in obtaining of the property title by the operating entity, the Central Processing Computer 70 triggers a voting procedure 290 for the Remote Users 30 that are holding units in the lien that has resulted in such property title acquisition. Based on a majority of votes (one vote per unit) placed in the voting procedure, the users with shared interest in the tax lien can decide to: (1) sell the property to another buyer, in which case when there is a prospective buyer that has been already identified 300 through the liquidation module, a sale of property is registered for this tax lien immediately based on the price agreed with such buyer 180, or if prospective buyer has not been identified, the listing managed by Property Liquidation Sub-system 110 is renewed to indicate that property title is obtained and process of finding prospective buyer (described above and detailed on FIG. 2) must take place, and after a prospective buyer is confirmed 170, a final net proceed amount after subtraction of applicable tax 340 from the purchase price is entered to the system, and payouts from these net proceeds are allocated 380 to the joint ownership users according to the respective number of units held by each Remote User 30; or (2) Remote Users 30 can vote 290 to buyout the property for their own use, in which case, after the users pay the tax lien final bid price 310 to the operating entity (who in turn pays the tax lien issuing authority), the record is created in Property Management Sub-System 120 which determines and displays a percentile stake in the property for each remote user 30 based on their respective number of units held in the tax lien, and also determines and displays a respective portion of rental income distribution and maintenance costs 320 for each remote user, where the total rental and maintenance figures can be entered and updated by the Operating Entity 20 or one of the Remote Users 30 that is responsible for the property and displayed via User Interface to the Remote Users 30 holding units in that tax lien. The Remote Users 30 can initiate another voting process and decide to sell the property instead of continue keeping it 350, in which case the record will be moved to Liquidation Sub-system for renewed listing 330 and will follow process described in option (1) of this paragraph.

In one embodiment, the voting process 290 outcome can be calculated based on one vote per unit. The Remote Users 30 that have not casted a vote are set with a default vote to sell property.

Figure 5:
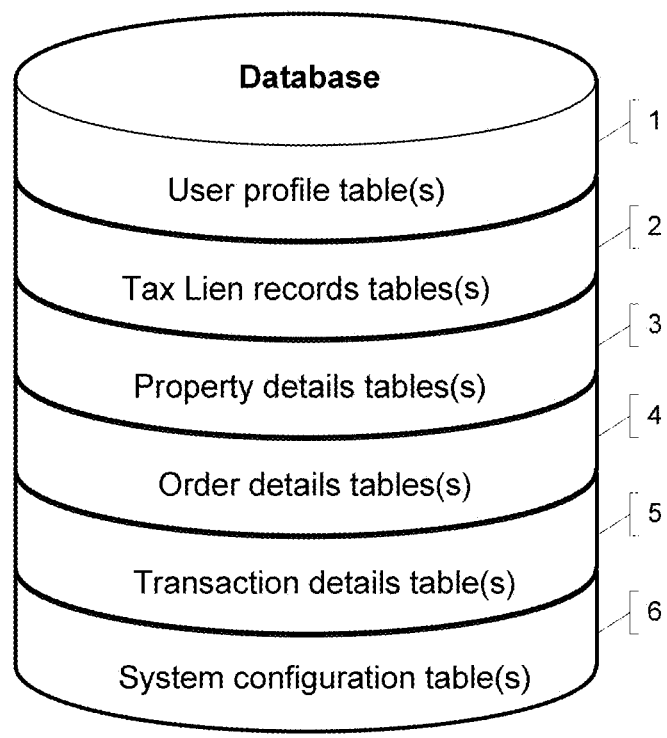
FIG. 5 depicts a database storage structure for Tax Lien records and Configuration settings information which is employed in the system for buying and selling property tax liens and determining tax lien fair value and price on a secondary market.

Central Processing Computer 70 saves all parameters into the Database 90 shown in FIG. 5, together with digital copies of tax lien documentation (when provided) 100 under Data Storage and Backup Facility 80. The data input from the user interface displayed to each user is transmitted through Communications Network 40 to Central Processing Computer 70 where the systems 120, 125 are connected to the Database 90. Obtaining of data from Database 90 is done through data queries lookup in various database tables. In the exemplary embodiment the Database 90 comprising plurality of database tables (could be also structured as separate databases instead of database tables). Exemplary database tables include:

User profile table(s) (1, FIG. 5): This table contains a set of user information including entity details and encrypted access credentials used to authorize such entities to access user interface 50, and the Administrative Terminal 60 on, or connected to, the Centralized Processing Computer 70.

Tax lien record table(s) (2, FIG. 5): This table contains a set of data about tax liens, such as tax lien initial price, property value of property backing tax lien, subsequent taxes cost, tax lien interest rate paid on initial price, tax lien final bid cost, property sale tax rate, tax lien redemption period and tax lien currency entered through the Administrative Terminal 60, and unique reference link(s) to the property details for tax lien saved to table 3, as well as unique reference link(s) to the digital copies of tax lien documentation stored at Data Storage and Backup Facility 80.

Property details table(s) (3, FIG. 5): This table contains a set of data about real-estate property related to tax liens in table 2, such as property description, property address entered through the Administrative Terminal 60, and unique reference link(s) to the digital photographs of the property stored at Data Storage and Backup Facility 80.

Order details table(s) (4, FIG. 5): This table contains a set of data containing a pool of all tax lien units in the system, to which the units of a new tax lien are added when a new tax lien is first entered into the system. Each tax lien unit in the pool has a respective record in the table, which includes a reference to, or identifier of, the tax lien in table 2 to which the unit belongs, an ownership field with a user ID of the current owner of the unit (e.g. the operating entity, or a remote user), and a current price of the unit. When a user specifies one or more units to be placed for sale in the marketplace, the identified units are located within the table and compiled into an open or active order, for example by changing the value of a status field in the records of the specified units and updating an asking price field of the record with a user-specified asking price for the units being sold. The field entries of the records of open orders are used by controls within the User Interface and Central Processing Computer 70 for communications between Remote Users 30 buying and selling tax liens or fractions of such. In a different embodiment, rather than storing the pool of all tax lien units within the order details table, and changing an open/active or closed/inactive status of each record based on whether the unit is currently offered for sale or not, a separate table for the pool of units may be maintained, with the order details table being populated only by open orders, each of which is created only an open order is requested by a user or the operating entity.

Transaction details table(s) (5, FIG. 5): This table contains a set of data for transactions between Remote Users 30 and also Operating Entity 20, including type of transaction such as buy, sell, or redemption, amount, currency, applicable fees, timestamp, and unique reference link(s) to tax lien stored in table 2 used within the User Interface 50, Administrative Terminal 60 and Central Processing Computer 70 for communications between Remote Users 30 and also Operating Entity 20 buying, selling, receiving redemption on tax liens or fractions of such.

System configuration table(s) (6, FIG. 5): This table contains a set of data for general and operational system settings including transaction fees, definition of selectable property types, definition of selectable currency types, languages, translations for communications between Remote Users 30, Operating Entity 20 via use of User Interface 50 or Administrative Terminal 60 and Central Processing Computer 70.

Data Storage and Backup Facility 80 in this present invention is configured to concurrently create a copy of the database 90 and a copy of digital format files with tax lien documentation 100 for backup and restoration purposes. Such copies can be restored to replace original in case of failure and can be created utilizing any standard computer software for creating and maintaining backup copies.

Figure 6:
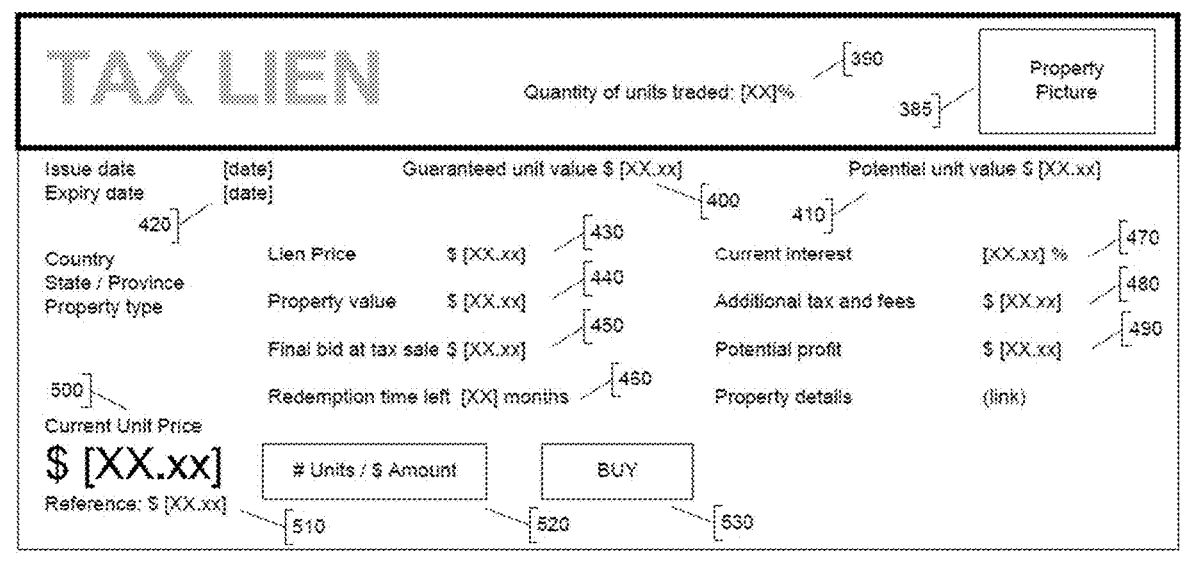

FIG. 6 illustrates a partial screenshot from a tax lien marketplace browsing area of the user interface in which a potential buyer can browse tax liens for which units are available for purchase from the operating entity and/or other users. The figure shows one such tax lien listing, which includes a thumbnail image 385 of the property that backs the tax lien; a quantity of available units currently offered for sale out of a total number of units in the given tax lien, including a fractional or percentage expression 390 of same, which is calculated automatically based on the number of units listed by users to sell and changes in real time as units are sold or additional units listed for sale; a guaranteed unit price 400 at which the buyer can sell a unit to the operating entity at any time, which is based on the initial price of the tax lien entered by the operating entity through the administration terminal (with or without interest) divided by the tax lien's total number of units; the potential unit value 410 (i.e. the potential tax lien profit P divided by the tax lien's total number of units), which is changed in real time if the cost of the property is updated (e.g. once a future buyer is confirmed via property liquidation module); the issue and expiry dates of the tax lien 420; an initial dollar amount 430 showing the initial cost of tax lien (when it issued), as entered by the operating entity through the administrative terminal; a property value 440 that is initially configured by the operating entity through the administrative terminal, but it is also updated via the property liquidation module when a prospective property buyer is confirmed, in which case the new value will be reflected in real-time, and will also impact all other automatically calculated values; a final bid amount 450 expected to be bid for the property at a tax sale, which may be known in advance (in jurisdictions where the operating entity is required to specify a final bid amount when acquiring the tax lien from the issuer); remaining redemption time 460 calculated automatically as the difference the redemption period end date and the current date, whether expressed in months, days, hours, etc., and updated in real-time; the annual interest rate 470 paid on the tax lien initial price, as configured by the operating entity through the administrative terminal; an additional tax/expense value 480 calculated as the sum of any known future expenses associated with the tax lien (subsequent taxes, deed application expenses, foreclosure expenses, etc.), as configured by the operating entity through the administrative terminal; the potential profit 490 of the tax lien, calculated the same way as 410 but not per unit, and updated in real time if property value changes; the current unit price 500 at which units are available for purchase (which as described above, may be an average of differently priced units available for purchase, updated in real-time, whereby only a single price is ever displayed regardless of the number of units available for purchase and any variation among the prices of same); the recommended fair secondary market price of the tax lien unit 510, calculated and updated in real time, for example based on the formula explained above (i.e. current time, value of property, and any other variables that change, will change the outcome); one or more purchase quantity fields 520 in which the buyer can specify the quantity to buy, either as a dollar amount or a number of units to buy; and a "buy" or "purchase" button 530 to complete a purchase based on the specified quantity.

Figure 7:
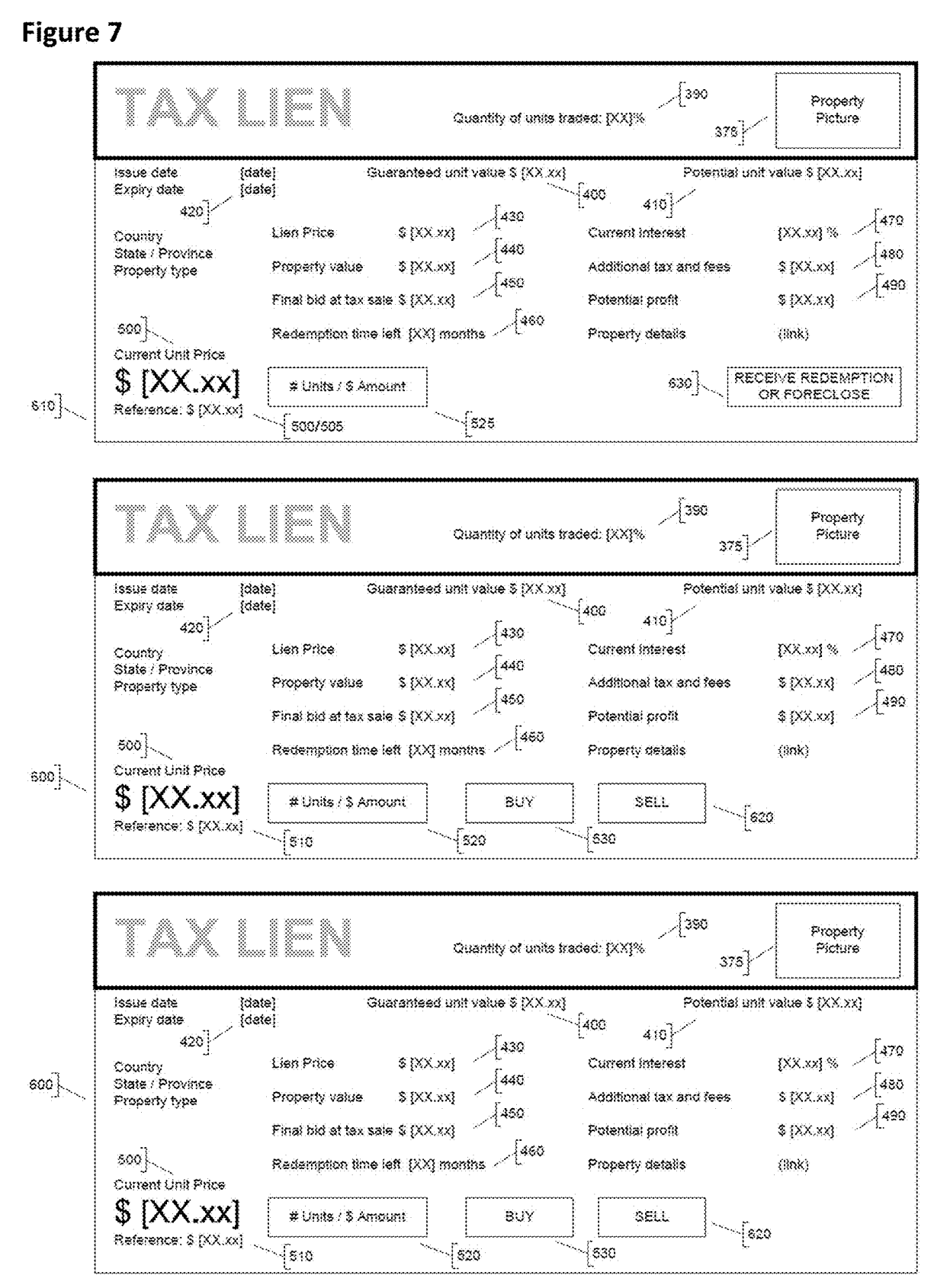

FIG. 7 illustrates a screenshot from a tax lien portfolio area of the user interface in which a user can view tax lien summaries of tax liens in which the user owns one or more units. In the illustrated embodiment, the summaries are presented in a list format, and each tax lien summary is similar in layout and appearance to the marketplace browsing area listing illustrated in FIG. 6. A header at the top of the summary features the property thumbnail image 385 from the FIG. 6 listing, and a similar unit quantity indicator including a percentage value 390, but expressing the number of units owned by the subject user of the portfolio, rather than the number of units available for sale, out of the total number of units of the given tax lien. The header may also include a tax lien identification number or other unique identifier (not shown) for the given tax lien. A display color used for each summary, for example the color of a border surrounding the header or the entire summary, differs according to the status of the tax lien, for example using one color to represent tax liens that have been redeemed or closed, and a different color to represent active leans in which the subject user has a full or partial ownership within the internal records of the system. In the example of FIG. 7, the bottom two summaries of the three illustrated summaries are active lien summaries 600, and the top summary is of a closed/redeemed lien summary 610.

Each active lien summary 600 contains the same information as the browsing area listing illustrated in FIG. 6, and the current unit price 470 (as an average value) will continue to be updated in real time anytime there is a change in unit price among the units of the tax lien concerned, for example based on purchase of other units in that same lien by another user. If there are no units currently offered for sale, then no current unit price is displayed, and may be replaced with an indication of "no offers" currently listed. Aside from the header, each active lien summary in the portfolio area differs from a listing in the marketplace browsing area in the addition of a "sell" button 620 beside the quantity fields, which the user can use to list the identified quantity of units 520 for available sale to other users in the browsing area. If the subject user already owns all the units of the given tax lien, the "buy" button 530 may be omitted, hidden or deactivated in the active lien summary in the user's portfolio.

Each redeemed lien summary 610 contains the same information as each active lien summary, but the current unit price 500 (as an average value) will no longer fluctuate since the units are no longer available for sale and therefore now have a fixed final unit price 505 calculated based on the initial lien value, plus any earned interest that the operating entity opted to pass on to users in the initial setup of the lien in the system, divided by the total number of units in the lien. Each redeemed lien summary in the portfolio area differs from the active lien summaries only in the replacement of the "sell" button with a "receive redemption" or "foreclose" button 630, and replacement of the user-fillable quantity field 520 with a redemption value display field 525 showing the total dollar value that the user will receive for the number of units they own of the given tax lien, as calculated by multiplication of the number of units owned by the subject user by the final unit price. Clicking the "receive redemption" button will cause transfer of the total dollar value (optionally minus any transaction fees applied by the operating entity) to a financial account of the user as specified in the stored user settings. As opposed to subtracting a transaction fee from the displayed total dollar value, transaction fees optionally implemented by the operating entity may instead already be factored in to the final unit price, in which case the displayed total dollar amount matches the dollar amount that is actually transferred to the user's account.

The hardware for the described embodiment features the Central Processing Computer 70 that may include one or more computers setup as a server machines (e.g. firewall server, web server, application server) connected to the Communications Network 40 that is accessed using all modern technology channels (e.g. internet, cellular mobile, etc.) and devices (e.g. computers, laptops, PDAs, cell phones etc.), and the Data Storage Facility 80 deployed, for example, using separate computers (e.g. database server, backup server) that are connected to Central Processing Computer 70. In one embodiment, the user interface is an internet website served by the central processing computer system for access to the system by both the Remote Users 30 and Operating Entity 20. Accordingly, although the illustrated embodiment shows the administrative terminal 60 in FIG. 1 as being incorporated into, or attached to, the central processing computer, it may alternatively be situated remotely and connected to the central processing computer through the internet or other communications network 40. The central processing computer system includes non-transitory computer readable memory having one or more software application stored thereon, including statement and instructions for execution by the processor(s) of one or more of the computers to execute the described processes.

In web-based embodiments where the user interface is presented to users within a web browser, the central processing computer serves the user interface to remote client devices (e.g. desktop computers or workstations, laptop computers, tablet computers, smart phones, PDA's etc.) in the form of a website displayed in the web browser on the display screen of the remote client devices. However, in other embodiments, one or more of the remote client devices may have a dedicated application stored on a computer readable memory of the remote client device for execution by a processor thereof, whereby the user interface is displayed on the remote client device by execution of the dedicated application. In such embodiments, the central computer therefore does not serve the user interface itself to the remote users, but receives requests from the remote user interface, such as requests to view listings of available lien units for purchase, requests to view listings of the properties in the liquidation subsystem and requests to view the user's portfolio of tax lien units, and transmits back to the remote client device the necessary information to display such listings within the user-interface of the dedicated application.

What is claimed is:

1. A computerized system for improved operation of an online marketplace, and particularly for executing buying and selling transactions for fractions of tax liens via a communications network, the system comprising a data storage database and a central processing computer system that is connected to said database and is communicable over said communications network with both an administrative terminal operated by an operating entity and remote devices operated by remote users, said central processing computer system comprising a processor and non-transitory computer readable memory coupled thereto, said non-transitory computer readable memory having stored thereon statements and instructions for execution by the processor that, when executed, perform the following steps:

i. receive (a) a communication containing tax lien data concerning a tax lien to be added to the system, including a user ID of a current owner of said tax lien, and property data concerning details of a real-estate property against which the tax lien was issued, and (b) indicia signifying a division value for splitting said new tax lien into a quantity of fractional units;

ii. store in the database:
   a) a tax lien record containing said tax lien data; and
   b) a real estate property record containing said property data;

iii. derive the division value from said indicia, and add to a pool of order records in the database a plurality of new order records in a quantity matching said division value, each of said new order records including (a) an ownership field containing said user ID, and (b) a reference to, or identifier of, the new tax lien record;

iv. receive from one of the remote devices identification of a quantity of said fractional units to be offered for sale by the current owner thereof and an asking price sought by said current owner, and based on said identification, locate corresponding order records in the pool, update an asking price field of each of said corresponding order records with said asking price;

v. calculate a fair secondary market value of the tax lien, and divide said fair secondary market value by the division value to derive a fair secondary market unit value;

vi. generate:
   a) a tax lien listing comprising at least some of the tax lien data from the tax lien record in the database, and also said fair secondary market unit value, said tax lien listing also including an image of the real estate property, a link to an additional source of information concerning the real estate property, indicia indicative of how many of the fractional units are currently offered for sale out a total number of said fractional units, indicia indicative of issue and expiry dates of the tax lien, indicia indicative of an initial price of the tax lien when it was first issued, indicia indicative of a property value of the real estate property, indicia indicative of an annual interest rate paid on the initial price of the tax lien, indicia indicative of a current unit price of the fractional units, one or more purchase quantity fields in which a buyer can designate, by number or dollar amount, a quantity of the fractional units to buy, and a purchase button for executing purchase of said quantity of the fractional units; and
   b) a liquidation listing comprising at least some of the property data from the database;
   and, in a user interface viewed on at least some of said remote devices, display said tax lien listing in a marketplace browsing area of said user interface for viewing thereof, by potential tax lien buyers, amongst other tax lien listings of a same type likewise generated for other tax liens likewise added to the system, and also display said liquidation listing in a separate property liquidation area of said user interface for viewing thereof, by potential property buyers, amongst other liquidation listings likewise generated for said other tax liens likewise added to the system;

vii. receive, from one of said remote devices on which the liquidation listing was displayed to said potential property buyers in the property liquidation area of the user interface, indicia signifying a conditional purchase price that a respective one of said remote users is offering for the property based on a viewing of said liquidation listing;

viii. from said indicia signifying the conditional purchase price, derive a numerical value of said conditional purchase price, and recalculate the fair secondary market value and the fair secondary market unit value using said derived numerical value; and ix. update the tax lien listing with indicia signifying both said recalculated fair secondary market unit value and an updated property value equivalent to said numerical value of said conditional purchase price, and display the updated tax lien listing in the marketplace browsing area of the user interface on one or more of said at least some of the remote devices;

x. receive, from one of the potential tax lien buyers, as a result of selection thereby of the purchase button of the tax lien listing in the browsing area of the user interface of one of said remote devices on which the tax lien listing was displayed to said one of the potential tax lien buyers, a purchase request that includes indicia of a purchase price for said quantity of said fractional units, and in response thereto, recording a sale of said quantity of fractional units by changing content of the ownership fields of an equal quantity of the corresponding order records to store therein a user ID of said one of the potential tax lien buyers, and update the unit price fields of said equal quantity of the corresponding order records with a value matching said purchase price;

xi. update the tax lien listing by calculating an updated unit price based on the purchase price, updating the indicia indicative of the current unit price according to said updated unit price, and updating the indicia indicative of how many of the fractional units are currently offered for sale by subtracting the quantity of said fractional units that were specified in the purchase request, and display the updated tax lien listing in the marketplace browsing area of the user interface of at least one of the remote devices;

xii. generate a tax lien summary for said one of the potential tax lien buyers that, like the updated tax lien listing, includes additional indicia signifying both said recalculated fair secondary market unit value and the updated property value, an additional image of the real estate property, an additional link to the additional source of information concerning the real estate property, additional indicia indicative of how many of the fractional units are currently offered for sale out the total number of said fractional units, additional indicia indicative of the issue and expiry dates of the tax lien, additional indicia indicative of the initial price of the tax lien, additional indicia indicative of the annual interest rate paid, and additional indicia indicative of the updated unit price of the fractional units, and that also includes one or more sell quantity fields in which a buyer can designate, by number or dollar amount, a new quantity of the fractional units to sell from among the quantity of the fraction units previously purchased via the purchase request, and a sell button for executing sale of the said new quantity of the fractional units via repetition of step iv above.

2. A computer implemented method for improved operation of an online marketplace, and particularly for executing buying and selling transactions for fractions of tax liens via a communications network using a computerized system comprising a data storage database and a central processing computer system that is connected to said database and is communicable over a communications network with both an administrative terminal operated by an operating entity and remote devices operated by remote users, said method comprising execution of the following steps by a processor of said computerized system:

i. receive (a) a communication containing tax lien data concerning a tax lien, including a user ID of a current owner of said tax lien, and property data concerning details of a real-estate property against which the tax lien was issued, and (b) indicia signifying a division value for splitting said new tax lien into a quantity of fractional units;

ii. store in the database:
a) a tax lien record containing said tax lien data; and
b) a real estate property record containing said property data;

iii. derive the division value from said indicia, and add to a pool of order records in the database a plurality of new order records in a quantity matching said division value, each of said new order records including (a) an ownership field containing said user ID, and (b) a reference to, or identifier of, the new tax lien record;

iv. receive from one of the remote devices identification of a quantity of said fractional units and an asking price therefore, and based on said identification, locate corresponding order records in the pool, and update an asking price field of each of said corresponding order records with said asking price;

v. calculate a fair secondary market value of the tax lien, and divide said fair secondary market value by the division value to derive a fair secondary market unit value;

vi. generate:
a) a tax lien listing comprising at least some of the tax lien data from the tax lien record in the database, and said fair secondary market unit value, said tax lien listing also including an image of the real estate property, a link to an additional source of information concerning the real estate property, indicia indicative of how many of the fractional units are currently offered for sale out a total number of said fractional units, indicia indicative of issue and expiry dates of the tax lien, indicia indicative of an initial price of the tax lien when it was first issued, indicia indicative of a property value of the real estate property, indicia indicative of an annual interest rate paid on the initial price of the tax lien, indicia indicative of a current unit price of the fractional units, one or more purchase quantity fields in which a buyer can designate, by number or dollar amount, a quantity of the fractional units to buy, and a purchase button for executing purchase of said quantity of the fractional units; and
b) a liquidation listing comprising at least some of the property data from the database;

and, in a user interface viewed on at least some of said remote devices, display said tax lien listing in a marketplace browsing area of said user interface for viewing thereof, by potential tax lien buyers, amongst other tax lien listings of a same type likewise generated for other tax liens likewise added to the system, and also display said liquidation listing in a separate property liquidation area of said user interface for viewing thereof, by potential property buyers, amongst other liquidation listings likewise generated for said other tax liens likewise added to the system;

vii. receive, from one of said remote devices on which the liquidation listing was displayed to said potential property buyers in the property liquidation area of the user interface, indicia signifying a conditional purchase price for the property;

viii. from said indicia signifying the conditional purchase price, derive a numerical value of said conditional purchase price, and recalculate the fair secondary market value and the fair secondary market unit value using said derived numerical value; and ix. update the tax lien listing with indicia signifying both said recalculated fair secondary market unit value and an updated property value equivalent to said numerical value of said conditional purchase price, and display the updated tax lien listing in the marketplace browsing area of said user interface on one or more of said at least some remote devices;

x. receive, from one of the potential tax lien buyers, as a result of selection thereby of the purchase button of the tax lien listing in the browsing area of the user interface of one of said remote devices on which the tax lien listing was displayed to said one of the potential tax lien buyers, a purchase request that includes indicia of a purchase price for said quantity of said fractional units, and in response thereto, recording a sale of said quantity of fractional units by changing content of the ownership fields of an equal quantity of the corresponding order records to store therein a user ID of said one of the potential tax lien buyers, and update the unit price fields of said equal quantity of the corresponding order records with a value matching said purchase price;

xi. update the tax lien listing by calculating an updated unit price based on the purchase price, updating the indicia indicative of the current unit price according to said updated unit price, and updating the indicia indicative of how many of the fractional units are currently offered for sale by subtracting the quantity of said fractional units that were specified in the purchase request, and display the updated tax lien listing in the marketplace browsing area of the user interface of at least one of the remote devices;

xii. generate a tax lien summary for said one of the potential tax lien buyers that, like the updated tax lien listing, includes additional indicia signifying both said recalculated fair secondary market unit value and the updated property value, an additional image of the real estate property, an additional link to the additional source of information concerning the real estate property, additional indicia indicative of how many of the fractional units are currently offered for sale out the total number of said fractional units, additional indicia indicative of the issue and expiry dates of the tax lien, additional indicia indicative of the initial price of the tax lien, additional indicia indicative of the annual interest rate paid, and additional indicia indicative of the updated unit price of the fractional units, and that also includes one or more sell quantity fields in which a buyer can designate, by number or dollar amount, a new quantity of the fractional units to sell from among the quantity of the fraction units previously purchased via the purchase request, and a sell button for executing sale of the said new quantity of the fractional units via repetition of step iv above.

\* \* \* \* \*